E. GRUENFELDT.
CONTROLLER FOR ELECTRIC MOTORS.
APPLICATION FILED JULY 26, 1909.

960,896.

Patented June 7, 1910.
2 SHEETS—SHEET 1.

Witnesses
Edwin L. Bradford
C. C. Wright

Inventor
Emil Gruenfeldt
By Edward R Alexander
Attorney

E. GRUENFELDT.
CONTROLLER FOR ELECTRIC MOTORS.
APPLICATION FILED JULY 26, 1909.

960,896.

Patented June 7, 1910.
2 SHEETS—SHEET 2.

Inventor
Emil Gruenfeldt
Witnesses
Edwin L Bradford
C. C. Wright
By Edward R. Alexander
Attorney

UNITED STATES PATENT OFFICE.

EMIL GRUENFELDT, OF CLEVELAND, OHIO, ASSIGNOR TO THE BAKER MOTOR VEHICLE COMPANY, OF CLEVELAND, OHIO, A CORPORATION OF OHIO.

CONTROLLER FOR ELECTRIC MOTORS.

960,896.  Specification of Letters Patent.  Patented June 7, 1910.

Application filed July 26, 1909. Serial No. 509,492.

*To all whom it may concern:*

Be it known that I, EMIL GRUENFELDT, a subject of the Emperor of Germany, residing at Cleveland, in the county of Cuyahoga and State of Ohio, have invented certain new and useful Improvements in and Relating to Controllers for Electric Motors, of which the following is a specification.

This invention relates to controller mechanism, more particularly to controller mechanism intended to be employed with a series wound motor having a plurality of fields.

One of the objects of my invention is to provide a controller with which in operation the motor circuit is never open or opened while the controller is being adjusted from step to step to vary the motor speed. This I seek to accomplish in a more efficient manner than has, to the best of my knowledge and belief, been heretofore done.

For the purpose of illustration I have, in the accompanying drawings, shown and herein described one form of controller mechanism embodying my invention, shown in connection with a motor having two series field windings.

Figure 1:
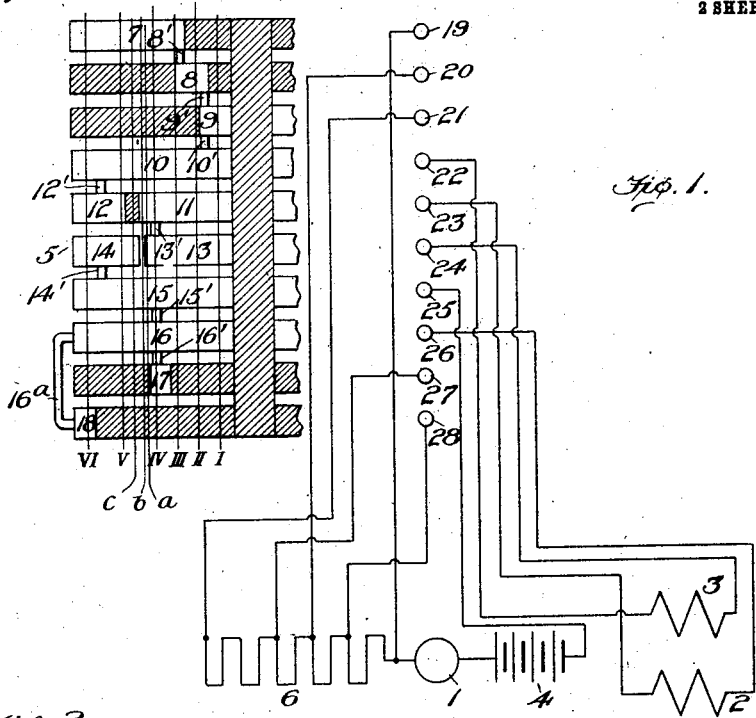

Figure 1 is a diagrammatic view of a motor and a controller, embodying my improvements, connected therewith. Figs. 2 to 10, inclusive, illustrate circuit connections corresponding to different positions of the controller drum in stepping from lowest speed to highest speed position of the drum.

The motor may be of any preferred construction having a plurality of series field windings, the controller illustrated in the drawings being intended for use with a series wound motor having two series field windings.

1 indicates the motor armature, 2, 3, the series fields, respectively, 4 a suitable source of electric current or current supply, such as a storage battery, and 5 the controller drum as an entirety. For the purpose of simplifying this description, I have avoided showing on the drum as developed any connections or controlling segments for reversing the motor, the segments or contact elements on the drum as developed being entirely for forward control.

6 is a resistance arranged to be interposed in the circuit in various relationships with the field windings through the operation of the controller.

In Fig. 1 the development of the part of the controller drum for forward control is shown, it being understood that this drum is rotatable about its axis. Upon the surface of the drum is arranged a plurality of contact segments, 7 to 18, inclusive, with connectors 8', 9', 10', 12', 13', 14', 15', 16' and 16ª, as shown, the segments being adapted to register and engage with corresponding brushes of any well known construction 19 to 28, inclusive. The connections between the brushes or fingers 19 to 28, inclusive, and the motor, series fields, source of current supply and resistance are indicated by lines representing suitable conductors, and are such that when the controller drum is in the position indicated by the controller-position I, the controller completes a circuit as follows: from bush 21 to resistance 6, through the resistance, armature 1, source of current supply 4, to brush 25, thence through contact 15, connector 15' to contact 16, finger 26, field 2, finger 23, segment 11, connection 13', segment 13, finger 24, field 3, finger 22, segment 10, and connector 10', to segment 9 and starting point brush 21.

Figure 2:
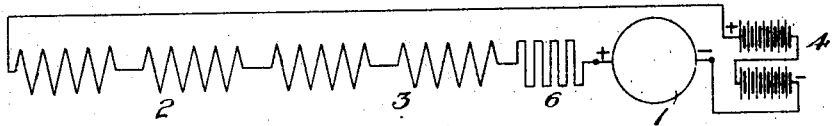
Figure 3:
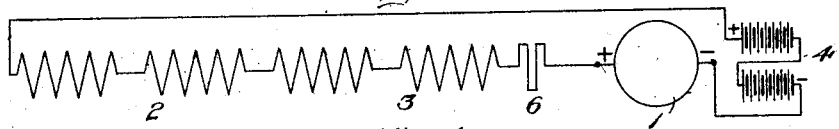
Figure 4:
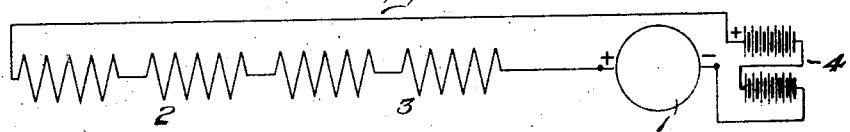
Figure 5:
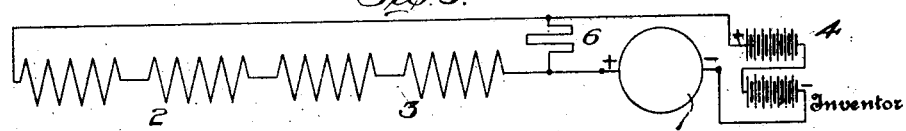
Figure 9:
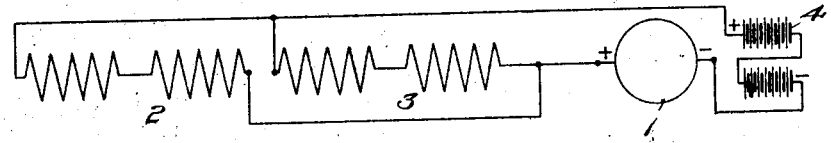

The diagram of connections when the controller drum is in position I is indicated in Fig. 2. The lines I to VI, inclusive, on the controller drum as developed, indicate the six speed positions of adjustment of the controller drum. When the controller drum is in position II the connections will be found such as illustrated in diagram, Fig. 3. In position No. III all of the resistance is cut out of the circuit and the diagram is shown in Fig. 4. In the position IV of the controller drum, the resistance 6 or part thereof is connected in parallel with the field 2, 3, as illustrated in diagram, Fig. 5. It will be understood that in passing from positions I to IV, the circuit remains always closed, the controller segments on the drum being so proportioned and related as to work this desired result of operation. Up to this point the controller described may be of any well known and preferred construction suitable for the purpose; such for example, as the controller disclosed in Letters Patent of the United States No. 811,533 to E. H. Anderson, dated February 6th, 1906, and it is not thought necessary to trace all of the connections for each position of controller up to and including the position IV. In stepping, however, from position No. IV to position No. V, namely, from a relationship of the circuit elements as shown in Fig. 5, where the two fields are in series and the resistance in parallel therewith, to the Vth position for the controller drum, as illustrated in Fig. 9, I have invented means for making the necessary changes of connection which are totally different from any controller means for similar purposes of which I am aware. These improvements I have made with the idea of overcoming the objections to the steps particularly followed by the said E. H. Anderson in his patented construction above referred to.

Figure 6:
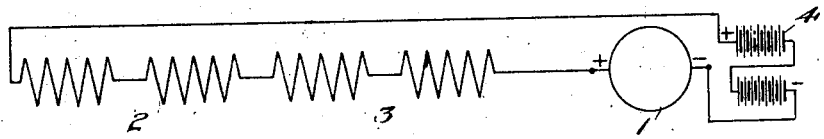
Figure 7:
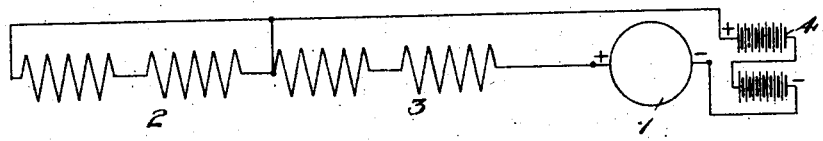
Figure 8:
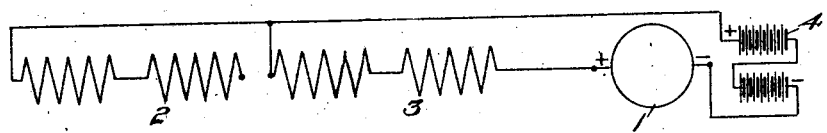
Figure 10:
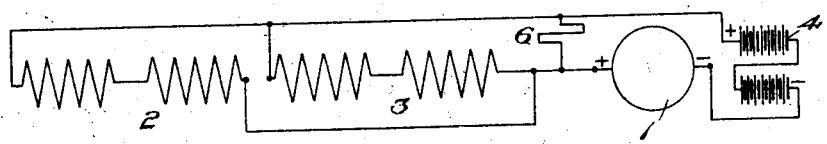

As my improved controller drum is moved from No. IV position toward No. V position, almost immediately the resistance 6 is entirely cut out of the circuit, this occurring as the segment 17 leaves the brush 27. The connections along line $a$ at this point of the closed circuit, shown in Fig. 6, are the same as illustrated for position III, namely, brush 19, armature 1, source of current supply 4, brush 25, segment 15, connector 15', segment 16, brush 26, field 2, brush 23, segment 11, connector 13', segment 13, brush 24, field 3, brush 22, segment 10, connector 10', segment 9, connector 9', segment 8, connector 8', segment 7 and return to brush 19. Immediately on further movement of the controller drum to line $b$, through the contacting of the brush 24 at the same time with both the segments 13 and 14, shunt is thrown across the circuit between the fields, as illustrated in Fig. 7, the connections now being brush 19, armature 1, source of current supply 4, brush 25, segment 15, connector 15', segment 16, brush 26, field 2, brush 23, segment 11, connector 13', segment 13, brush 24, segment 14, and connector 14' to segment 15 (thus putting a shunt across the field 2). From segment 13 connection is also made by brush 24 to field 3, brush 22, segment 10 and thence to segment 7 and return to brush 19. Upon further movement of the drum in forward direction to line $c$ the segment 11 leaves the finger 23 and field 2 is momentarily cut out of the circuit, as illustrated in Fig. 8, the connections now being brush 19, armature 1, source of current supply 4, brush 25, segment 15, connector 14', segment 14, brush 24, field 3, brush 22 and thence to segment 7 and return to brush 19, the field 2 being entirely cut out. Immediately thereafter and upon the engagement of the finger 23 with the segment 12 position V, the field 2 through the segments 12 and 10 is connected in parallel with field 3, as indicated in Fig. 9. When the controller drum is moved to position VI, the connection stays the same as for Fig. 9 with the addition of shunting a portion of resistance across the field part of the circuit, as indicated in Fig. 10, this being accomplished through the engagement of the segment 18 with the brush 28.

Heretofore, so far as I am aware, and especially in the patented controller of the said E. H. Anderson, when stepping from an arrangement of connections such as illustrated in Figs. 4 and 5 in which the fields are in series, to one such as illustrated in Fig. 9, in which the fields are in parallel, a resistance has been interposed in the circuit in parallel with the field windings; then with this resistance still in the circuit one of the field windings has been shunted, thus very materially weakening the field and allowing a great and sudden increase of speed of the armature, with consequent inefficient electrical results and jerk on the driving mechanism, consequently involving the armature under great load; then the said resistance was removed or cut out and thereafter also the shunted field winding, but by this time the inefficient connection through the operation of the controller had been made and the undesirable results experienced, and it was not until after these inefficiencies and undesirable results in operation of the controller had been encountered that the then cut out or open series field was connected in parallel with the series field in the circuit. In other words, Anderson in seeking to construct a highly efficient form of controller with which the various steps could be taken, fields in series to fields parallel without opening the circuit, devised a drum, segments and brushes so correlated that the operations incident to making such step were ones which resulted in waste of current, electrical inefficiency, and possibly serious strains on the motor and driving mechanism, as well as unnecessary and increased demand upon the battery in ampere consumption. With a controller of my improved construction, the operations in stepping from field in series to field in parallel, are not attended with the undesirable features and characteristics incident to such operation with a controller of the Anderson type, but on the contrary, the said operations in my improved controller tend to maintain greater uniformity of torque during such operations and more uniform ampere consumption than is incident to the Anderson type of controller or any other earlier controller mechanism of this class, of which I am aware.

What I claim is:

1. A controller of the class described, having a plurality of running positions and contacts arranged to connect a source of current supply and a motor having a plurality of series field windings in one position with said field windings in series, to place a resistance in parallel with the field windings in a second position, and to remove said resistance and connect the field windings in parallel in a third position, certain of said contacts operating in passing from said second to the third position, first to remove said resistance from the circuit, then to shunt one of said field windings, then to open said shunted field winding, and then to connect said open field winding in parallel with the other field winding, the circuit at all times remaining closed.

2. A controller for effecting variations in connections of a resistance, a motor having two series field windings and a source of current supply, said controller having contacts arranged to connect said field windings in series at one step; at the next step to place said resistance in parallel with the field windings, and at the third step to connect said field windings in parallel, the contacts of the said controller operating in passing from the second to the third step, first to remove said resistance from the circuit to shunt one of said field windings, then to open said shunted field winding, and then to connect said open field winding in parallel with the other field winding, the circuit at all times remaining closed.

In testimony whereof I affix my signature, in the presence of two witnesses.

EMIL GRUENFELDT.

Witnesses:
ELLEN C. GUSTAFSON,
ROY B. McHENRY.

---

Correction in Letters Patent No. 960,896.

It is hereby certified that in Letters Patent No. 960,896, granted June 7, 1910, upon the application of Emil Gruenfeldt, of Cleveland, Ohio, for an improvement in "Controllers for Electric Motors," an error appears in the printed specification requiring correction as follows: Page 3, line 18, after the word "circuit" a comma and the word *then* should be inserted; and that the said Letters Patent should be read with this correction therein that the same may conform to the record of the case in the Patent Office.

Signed and sealed this 5th day of July, A. D., 1910.

[SEAL.]

F. A. TENNANT,
*Acting Commissioner of Patents.*